May 20, 1952  R. E. MARBURY  2,597,012
HIGH-VOLTAGE PROTECTIVE GAP DEVICE
Original Filed Aug. 18, 1949

WITNESSES:

INVENTOR
Ralph E. Marbury.
BY
ATTORNEY

Patented May 20, 1952

2,597,012

UNITED STATES PATENT OFFICE 2,597,012

HIGH VOLTAGE PROTECTIVE GAP DEVICE

Ralph E. Marbury, Pittsburgh, Pa., assignor to Westinghouse Electric Corporation, East Pittsburgh, Pa., a corporation of Pennsylvania Original application August 18, 1949, Serial No. 110,947. Divided and this application October 9, 1950, Serial No. 189,171

16 Claims. (Cl. 313—231)

The present invention relates to high-voltage protective gap devices and, more particularly, to a self-clearing gap device intended primarily for the protection of series capacitors in high-voltage, synchronous, alternating-current transmission lines where system stability is a primary or limiting consideration in the operation of the line. This application is a division of my copending application Serial No. 110,947, filed August 18, 1949, and assigned to the Westinghouse Electric Corporation.

Capacitors are connected in series in alternating-current transmission or distribution lines to neutralize part, or all, of the inductive reactance of the line, in order to raise the stability limit, or the power limit, of a transmission line, or to improve the voltage regulation of a distribution line. Since such capacitors are connected directly in series in the line and carry the line current, the voltage across the capacitor is proportional to the line current, and in case of a fault on the line, the voltage across the capacitor may rise to many times its normal value. Standard capacitor units, such as are used in series capacitor installations, are capable of withstanding overvoltages of the order of 150% of normal voltage for brief periods, but they cannot be subjected to materially higher overvoltages, even momentarily, without the probability of damage.

It is not practical to utilize capacitors which are capable of withstanding the maximum voltage to which they may be subjected under fault conditions, because of the excessive cost, since the cost of a capacitor increases approximately as the square of the voltage for which it is designed. A series capacitor installation, therefore, usually consists of capacitor units having a voltage rating determined on the basis of the normal voltage across the capacitor, together with a protective system for bypassing the capacitor under fault conditions, or other excess-current conditions, in order to protect the capacitor against overvoltage. In order to adequately protect the capacitor, the protective system must operate to bypass it substantially instantaneously upon the occurrence of an overvoltage of predetermined magnitude, that is, the capacitor must be effectively bypassed within the first half-cycle of fault current. Because of this requirement of substantially instantaneous operation, spark gaps are usually used in these protective systems, since no switch, or other device involving moving parts or mechanical movement, could operate fast enough.

When a series capacitor is installed in a high-voltage transmission line, where system stability is an important or limiting consideration in the operation of the line, and where the series capacitor is installed for the primary purpose of raising the stability limit, so as to increase the amount of power that can be transmitted over the line, the problem of protection becomes quite difficult. This is for the reason that the capacitor must be bypassed substantially instantaneously upon the occurrence of a predetermined overvoltage and is thus effectively removed from service during fault conditions, when the stability problem is most acute. The protective system must, therefore, operate to remove the bypass and restore the capacitor to service immediately after the fault has been cleared, so that it will be available to assist in maintaining stability during the critical transient conditions immediately following clearing of the fault. For this reason, protective systems of the type which have been used for series capacitors installed in distribution lines, for improving the voltage regulation, cannot be used with series capacitors in high-voltage transmission lines, since these systems operate to interrupt the bypass and restore the capacitor to service in response to decrease of the line current to its normal value, or after a predetermined time, and thus necessarily involve a delay of at least several cycles after a fault has been cleared before the capacitor is restored to service. If such a protective system were used with a series capacitor installed in a high-voltage transmission line for the primary purpose of improving stability conditions and increasing the amount of power which can be transmitted over the line, the capacitor would be removed from service and not available for its intended purpose during the time when it is most needed, that is, during the critical transient conditions which occur in the first few cycles following clearing of a fault.

I have provided a protective system for series capacitors in high-voltage transmission lines, which is claimed in my parent application referred to above, in which the series capacitor is bypassed, or shunted by a voltage-limiting resistor, immediately upon the occurrence of a predetermined overvoltage across the capacitor, and in which the capacitor is restored to service substantially immediately, or within the first half-cycle, after the fault has been cleared, so that the capacitor is fully available to assist in maintaining stability during the critical transient conditions immediately following the fault. This result is obtained by means of a self-clearing spark gap device connected across the capacitor, which breaks down immediately upon the occurrence of an overvoltage, and in which the arc is extinguished at each current zero, by means of an air blast, so that the arc does not restrike on the succeeding half-cycle unless the voltage rises to, or near, the original breakdown voltage of the gap. Thus, the arc fails to restrike, and the series capacitor is restored to service, in the first half-cycle in which the voltage fails to rise above a safe value.

The principal object of the present invention is to provide a self-clearing, high-voltage, protective gap device suitable for use in a protective system of this kind for series capacitors.

Another object of the invention is to provide a high-voltage protective gap device which is made self-clearing by means of an air blast.

A further object of the invention is to provide a high-voltage protective gap device which is made self-clearing by means of an air blast, and which is provided with means for initiating the air blast as soon as the gap breaks down, so that the arc in the gap is extinguished at each current zero and fails to restrike in the first half-cycle in which the voltage across the gap does not rise above a value near the initial breakdown voltage.

A still further object of the invention is to provide a high-voltage protective spark gap device, especially adapted for series capacitor protection, which is designed to be made self-clearing by means of an air blast, and which is insulated from ground by an insulator column having means for conveying air from the ground end of the column to the gap and means for providing an adequate supply of air closely adjacent the gap, so that the air blast can be started as soon as the gap breaks down and maintained as long as the gap continues to arc.

The invention will be more fully understood from the following detailed description of an illustrative embodiment, taken in connection with the accompanying drawing, in which.

Figure 1:
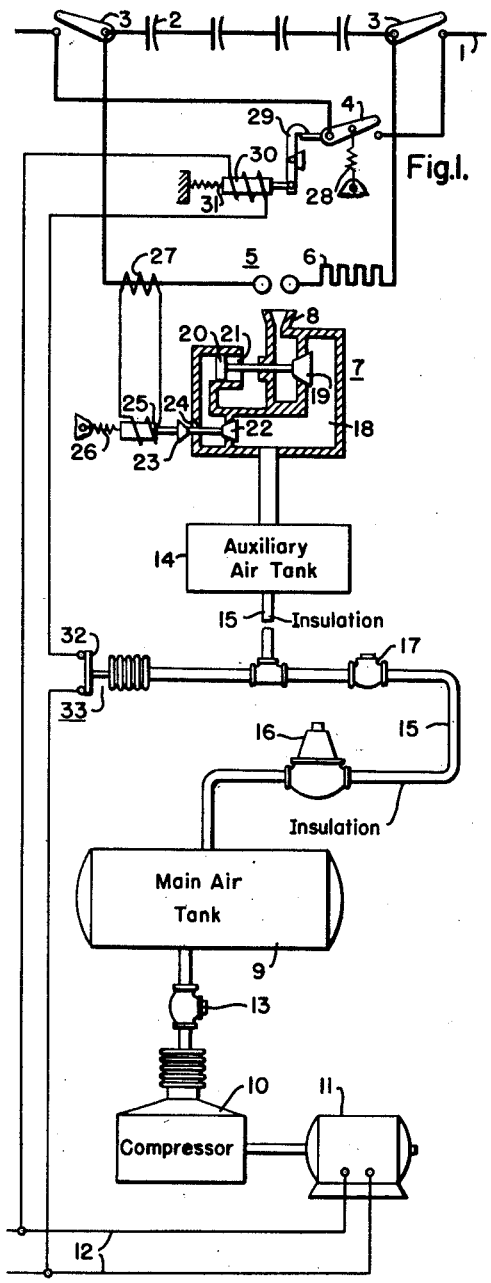
Figure 1 is a schematic diagram showing a series capacitor installation.

The invention is shown in the drawing embodied in a series capacitor installation in an alternating-current line 1. The line 1 represents one phase of a high-voltage, three-phase, synchronous transmission line in which a series capacitor is installed for the purpose of raising the stability limit of the line, so as to increase the amount of power that can be transmitted over it. Only one phase has been illusrated in the drawing, for the sake of simplicity, but it will be understood that the other phases include similar apparatus. The series capacitor 2 consists of a suitable number of capacitor units connected to each other in series or series-parallel to provide the desired capacitive reactance and current capacity, and is connected in series in the line 1. The term "capacitor," as used herein, is to be understood as including any necessary number of individual capacitor units. Isolating disconnecting switches 3 are preferably provided on each side of the series capacitor 2, and a bypass disconnecting switch 4 is connected across the capacitor, so that the capacitor can be bypassed, and isolated from the line, for inspection and maintenance. The bypass disconnecting switch 4, which is normally open, is shown as being automatically controlled, as hereinafter described, but it will be understood that the switch 4 may also be controlled manually for bypassing the capacitor whenever desired, and that any necessary additional automatic control means may also be provided.

As previously explained, the series capacitor 2 is subject to dangerous overvoltages in case of a fault, or other excess-current condition, on the line 1, and it must be protected substantially instantaneously upon the occurrence of a voltage across the capacitor in excess of a predetermined safe value, such as 150% of the normal voltage. For this purpose, a protective spark gap device 5 is provided, and a resistor 6 is connected in series with the gap device 5. The series-connected gap 5 and resistor 6 are connected across the series capacitor 2, as shown in Fig. 1, and the gap 5 is designed and adjusted to break down and become conducting whenever the instantaneous voltage across the capacitor exceeds the predetermined safe value. The resistor 6 is preferably designed so that when connected in parallel with the capacitor 2 by breakdown of the gap 5, it limits the voltage across the capacitor to a safe value, but without completely bypassing the capacitor, so that some capacitive reactance will be available in series with the line to assist in maintaining stability during fault conditions. If desired, however, a smaller resistor might be used to serve merely as a damping resistor to prevent oscillatory discharge of the capacitor when the gap breaks down and to limit the transient capacitor discharge current.

The spark gap device 5 is a self-clearing gap, so that the arc in the gap is extinguished at each current zero, and does not restrike unless the instantaneous voltage in the succeeding half-cycle rises above a predetermined value near the initial breakdown voltage of the gap. Any suitable type of self-clearing gap device may be used, but it is preferred to obtain the self-clearing characteristics by means of a blast of deionizing gas directed through the space between the electrodes of the gap device. In the preferred embodiment of the invention, an air blast is utilized to make the gap 5 self-clearing, and the air blast is controlled by a valve device 7, which directs the air through a nozzle 8 into the gap space. The valve device 7 is automatically controlled, as explained hereinafter, so as to initiate the air blast substantially immediately upon breakdown of the gap 5, that is, as soon as current starts to flow in the circuit of the gap and resistor, and to maintain the air blast until current ceases to flow in the gap circuit, when the air blast is interrupted.

In operation, the gap device 5 breaks down to connect the resistor 6 in parallel with the capacitor 2 whenever the instantaneous voltage across the capacitor 2 exceeds the predetermined safe value for which the gap is set. As soon as the gap 5 has broken down, the air blast is immediately started. The arc in the gap 5, therefore, will be extinguished at each current zero and will not restrike until the voltage across the capacitor reaches the breakdown value on the succeeding half-cycle. Thus, the gap will continue to disconnect the resistor 6 at each current zero and to reconnect it during the succeeding half-cycle as soon as the voltage exceeds the predetermined value. This continues until the excess-current condition has passed, and the arc in the gap 5 will then fail to restrike in the first half-cycle after the fault has been cleared. The air blast is then turned off.

The air blast may be supplied to the gap device 5, through the valve 7, in any suitable manner. Since the gap 5 must be insulated from ground for the full line voltage, however, and since the line voltage may be quite high, of the order of 220 kv., for example, in the type of installations for which this system is primarily intended, there are certain practical problems involved in providing an adequate supply of air under sufficient pressure to the gap 5 to maintain the blast as long as needed. The air blast must be directed into the gap immediately after it has first broken down, without a delay of more than 1½ or 2 cycles, and must be maintained as long as the gap continues to break down, which may be a considerable number of cycles. These requirements necessitate a substantial supply of air, which must be close to the gap, to avoid the delay involved in getting the air to the gap from a tank at a considerable distance, but the gap must be insulated for line voltage, which means it is spaced a considerable distance from any equipment at ground potential.

A preferred system for supplying the air blast is illustrated in the drawing. A main compressed air tank 9 is provided and is supplied with compressed air by means of a compressor 10 driven by a motor 11, which may be supplied from any available low-voltage source 12 of control power. The motor 11 may be controlled automatically in any suitable manner to operate the compressor 10 to maintain the air in the main tank 9 at a desired pressure, which may, for example, be of the order of 150 pounds per square inch, the compressor being connected to the tank 9 through a check valve 13 in the usual manner. It is not desirable to attempt to insulate the tank 9, the compressor 10 and its driving motor 11 from ground, and the tank 9 is therefore connected to an auxiliary air tank 14 by means of an insulating conduit 15, which permits the auxiliary tank 14 to be mounted near the gap 5 and insulated from ground, so that an adequate supply of air can be provided close to the gap. A pressure regulator 16 of any suitable type is preferably interposed in the conduit 15 to maintain the pressure in the auxiliary air tank 14 at a desired lower value, which may, for example, be of the order of 100 pounds per square inch, and a check valve 17 is preferably also provided in the conduit 15.

The auxiliary air tank 14 is disposed to supply the air blast directly to the gap 5 through the valve device 7. Any suitable type of valve device 7 may be utilized which can be opened very rapidly in response to current flow in the circuit of the gap 5 and resistor 6, and closed automatically when current flow ceases. The particular valve device 7 shown diagrammatically in Fig. 1 has a valve chamber 18 which is normally closed by a main valve 19. The main valve 19 is adapted to be actuated by a piston 20 moving in a cylinder 21 which is connected to the valve chamber 18. Air is admitted to the cylinder 21 from the valve chamber 18 through a port which is normally closed by a pilot valve 22, which also includes a second valve member 23 cooperating with a normally open port 24 for exhausting the cylinder 21. The pilot valve 22 is adapted to be actuated by means of a solenoid 25 and is normally held in its closed position, shown in the drawing, by a tension spring 26, or other suitable biasing means. The solenoid 25 is energized by the current in the circuit of the gap device 5, either directly or by means of a current transformer 27.

When a fault, or other excess-current condition occurs on the line 1, the gap 5 breaks down to connect the resistor 6 across the capacitor 2 to limit the voltage across the capacitor, as explained above. As soon as the gap has broken down and current flows through the circuit of the gap 5 and resistor 6, the solenoid 25 is energized and moves the pilot valve 22 to the right, as viewed in Fig. 1, closing the exhaust port 24 and admitting air from the valve chamber 18 to the cylinder 21. The air pressure thus applied to the piston 20 moves the main valve 19 to the right to admit air from the valve chamber 18 to the nozzle 8, which directs the air blast into the gap 5. The air blast effectively deionizes the arc space in the gap and thus extinguishes the arc at each current zero. As long as the excess-current condition still exists, the arc restrikes on each half-cycle as soon as the instantaneous voltage has increased to the predetermined value for which the gap is set, and this continues until the fault is cleared, or the current has returned to its normal value. This continuous restriking of the arc in each half-cycle causes an intermittent current in the circuit of the gap 5 which maintains the solenoid 25 sufficiently energized to keep the pilot valve in its open position, so that the main valve 19 is held open and the air blast is continuous during this period. When the fault is cleared, and the instantaneous voltage across the capacitor fails to rise to the breakdown voltage of the gap, the arc in the gap 5 will fail to restrike, so that current ceases to flow in the circuit of the gap device. The solenoid 25 is thus deenergized and the tension spring 26 returns the pilot valve 22 to the position shown in the drawing, in which the exhaust port 24 is opened and the cylinder 21 closed off from the valve chamber 18. The air pressure in the cylinder 21 is thus exhausted, and the air pressure in the valve chamber 18 acting on the main valve 19 returns it to closed position, interrupting the air blast.

The bypass disconnecting switch 4 is automatically controlled to bypass the capacitor 2 in case of failure of air pressure. The switch 4 is shown diagrammatically as being biased to closed position by a spring 28 and is normally held in the open position by a latch 29. The latch 29 is normally held in position to hold the switch 4 open by a solenoid 30, and upon deenergization of the solenoid, the latch 29 is moved by a compression spring 31, or other suitable biasing means, to release the bypass switch 4 and permit it to be closed by the spring 28. The solenoid 30 is normally continuously energized from the control source 12, and the circuit includes the normally closed contacts 32 of a pressure switch 33, which is connected to the auxiliary air tank 14 or the conduit means 15, so as to be responsive to the pressure in the auxiliary tank 14. The switch 33 is adjusted to open its contacts and permit the latch 29 to release the disconnecting switch 4 to bypass the capacitor 2 if the pressure in the auxiliary tank 14 falls below a predetermined minimum value, which may, for example, be 80 pounds per square inch if the normal pressure in the tank is 100 pounds per square inch.

Figure 2:
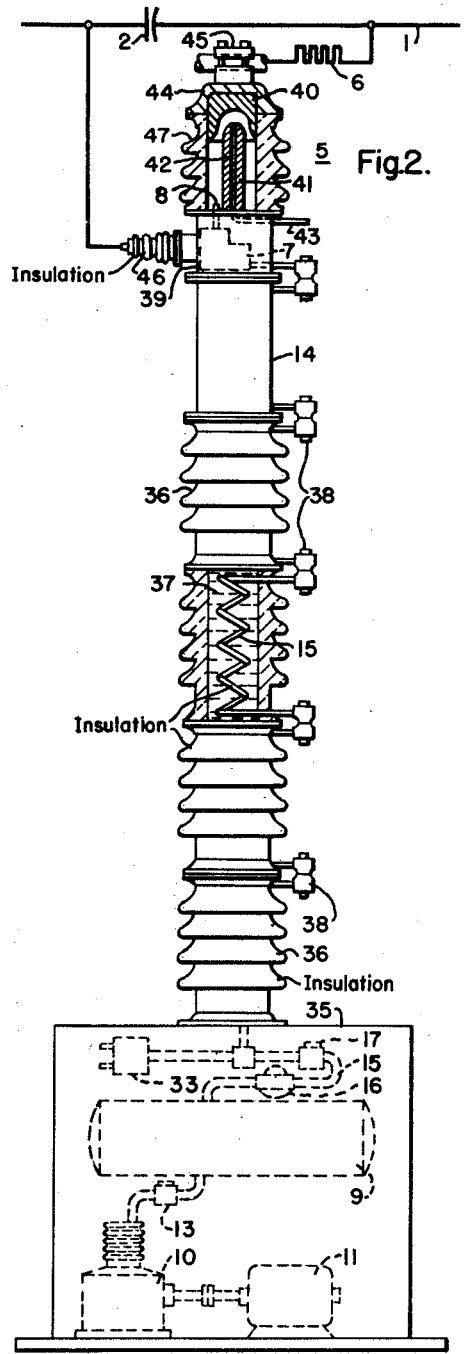
Fig. 2 is a view, partly in elevation and partly in vertical section, of a protective gap device embodying the invention.

A preferred practical structure for the gap device 5, and its associated air system, is shown in Fig. 2. As shown in this figure, the main air tank 9, compressor 10, and motor 11 are placed in a housing 35, which may be mounted on the ground or on any suitable supporting structure, and which does not have to be insulated from ground. The gap device 5, valve 7 and auxiliary air tank 14 are insulated from ground for the full line voltage, and are mounted on top of a vertical column of insulating elements 36, which is utilized to convey the air from the main tank 9 to the auxiliary tank 14. The insulators 36 may be hollow porcelain insulators of any suitable type, mounted end-to-end in a vertical column, a sufficient number of insulators being used for the particular voltage. The auxiliary air tank 14 is preferably a cylindrical steel tank and is mounted vertically on top of the uppermost insulator 36, as shown. The insulator column may be placed on top of the housing 35, or in any convenient location. The auxiliary air tank 14 is connected to the main air tank 9 by means of insulating conduit 15, which is preferably made of thick-walled rubber tubing which is capable of withstanding the air pressure, and which can be stressed at a reasonable voltage, which may, for example, be of the order of 2000 volts per foot. The portion of the conduit 15 which is within the housing 35 may, however, be ordinary pipe and is connected to the rubber tubing at the bottom of the lowermost insulator 36. The rubber tubing extends through the hollow insulators 36, being disposed in a helical coil in each insulator, and the insulators are preferably filled with a suitable insulating compound 37. In order to avoid the necessity of providing airtight gaskets or other sealing means between the insulators, the conduit 15 is brought out at each end of each insulator, and joined between adjacent insulators by means of pressure fittings, or so-called "ammonia type" fittings 38. The valve 7 is mounted in a valve housing 39, which is placed on top of the auxiliary air tank 14, and the gap device 5 is mounted directly on top of the valve housing 39.

The preferred type of gap device 5, as shown in Fig. 2, has massive graphite electrodes which are capable of sustaining continued arcing without excessive heating or other damage. The gap has an upper hollow electrode 40, which is generally cup-shaped with the hollow opening downward, and it has a lower rod-like electrode 41, which is disposed vertically and extends into the hollow of the upper electrode 40, the electrodes being spaced apart to form a gap between them having the desired breakdown voltage. The lower electrode 41 has a central opening 42 extending through it, and a vent pipe 43 is connected to the opening 42 at its lower end, that is, the end remote from the gap. The vent pipe 43 may extend through the valve housing 39 and discharges into the air, while the nozzle 8 of the valve device 7 extends upward beside the lower electrode 41, so that the air blast is directed into the space between the electrodes and the air escapes through the opening 42 and the vent pipe 43. The direction of air flow is thus upward in the space between the electrodes and down through the opening 42 of the lower electrode 41. This direction of air flow is important since if the air flowed in the opposite direction, it would drive the arc down in the annular space between the electrodes, thus tending to move the arc into a space of larger area and decreasing air pressure where extinguishment of the arc would be more difficult. By directing the air blast upward between the electrodes and down through the central opening 42, the arc is held more or less centered between the electrodes in a region of maximum air pressure where it is easily extinguished. The upper electrode 40 is mounted in a metal cap member 44, which carries a terminal device 45 of any suitable type for connection of a lead to the upper electrode. The lower electrode 41 is mounted on a bottom plate which may also form the top of the valve housing 39, and a suitable bushing 46 carried on the valve housing 39 for connection of a lead to the electrode 41. The gap device 5 is enclosed in a porcelain housing 47 which encloses the gap space and insulates the electrodes from each other.

It will be seen that a high-voltage protective gap device is thus provided which is adequately insulated from ground for the full line voltage and which is made self-clearing by an air blast. The auxiliary air tank 14 and valve 7 are also insulated from ground and are mounted directly adjacent the gap 5, so that when the valve 7 is opened in response to current flow through the gap, the air blast is initiated immediately without the delay that would be occasioned if the air had to be brought from a main tank at ground potential. The use of the auxiliary tank also makes it possible to provide a relatively large air supply closely adjacent the gap, so that the air blast can be maintained with undiminished intensity during the entire time that the gap 5 continues arcing. Thus, a desirable practical structure is provided for a self-clearing gap device suitable for use in the protective system of Fig. 1.

It should now be apparent that a protective gap device has been provided which is especially adapted for the protection of series capacitors in high-voltage transmission lines, or for the protection of other high-voltage apparatus where a self-cleaning gap is desirable. A particular embodiment of the invention has been shown for the purpose of illustration, but it will be obvious that various other embodiments and modifications are possible within the scope of the invention, and in its broadest aspects it includes all equivalent embodiments and modifications which come within the scope of the appended claims.

I claim as my invention:

1. A high-voltage protective gap device adapted to be connected across an electrical device for overvoltage protection, said gap device comprising a first electrode having a hollow therein, a second generally rod-like electrode extending into the hollow of the first electrode and having a central opening therethrough, means for supporting said electrodes in spaced relation to form a gap within the hollow of the first electrode, and means for directing a blast of arc-extinguishing gas into the space between the electrodes to flow through said space and be discharged through the central opening of the second electrode.

2. A high-voltage protective gap device adapted to be connected across an electrical device for overvoltage protection, said gap device comprising a first electrode having a hollow therein, a second generally rod-like electrode extending into the hollow of the first electrode and having a central opening therethrough, said electrodes being spaced apart to form a gap and being enclosed in a housing, means for directing a blast of arc-extinguishing gas into the space between the electrodes, and vent means connected to the opening in the second electrode at the end thereof remote from the gap.

3. A high-voltage protective gap device adapted to be connected across an electrical device for overvoltage protection, said gap device comprising an insulating housing, a first electrode having a hollow therein, said first electrode being mounted in the top of the housing with the hollow opening downward, a generally rod-like second electrode mounted in the housing and extending up into the hollow of the first electrode, the electrodes being spaced apart to form a gap, said second electrode having a central opening therethrough, means for directing a blast of arc-extinguishing gas into the space between the electrodes, and vent means connected to the opening in the second electrode at the end thereof remote from the gap and extending outside the housing.

4. A high-voltage protective gap device adapted to be connected across an electrical device for overvoltage protection, said gap device comprising a first electrode having a hollow therein, a second generally rod-like electrode extending into the hollow of the first electrode and having a central opening therethrough, means for supporting said electrodes in spaced relation to form a gap within the hollow of the first electrode, means for directing a blast of arc-extinguishing gas into the space between the electrodes to flow through said space and be discharged through the central opening of the second electrode, and valve means for controlling said gas blast to initiate the blast immediately after a discharge has started in the gap and to interrupt the blast when current ceases to flow through the gap.

5. A high-voltage protective gap device adapted to be connected across an electrical device for overvoltage protection, said gap device comprising a first electrode having a hollow therein, a second generally rod-like electrode extending into the hollow of the first electrode and having a central opening therethrough, said electrodes being spaced apart to form a gap and being enclosed in a housing, means for directing a blast of arc-extinguishing gas into the space between the electrodes, vent means connected to the opening in the second electrode at the end thereof remote from the gap, and valve means for controlling said gas blast to initiate the blast immediately after a discharge has started in the gap and to interrupt the blast when current ceases to flow through the gap.

6. A high-voltage protective gap device adapted to be connected across an electrical device for overvoltage protection, said gap device comprising spaced electrodes, means for directing a blast of air into the space between the electrodes, an auxiliary compressed air tank adjacent the gap device for supplying said air blast, a main compressed air tank remote from the gap device, and insulating conduit means connecting the main air tank to the auxiliary air tank.

7. A high-voltage protective gap device adapted to be connected across an electrical device for overvoltage protection, said gap device comprising spaced electrodes, means for directing a blast of air into the space between the electrodes, an auxiliary compressed air tank adjacent the gap device for supplying said air blast, said gap device and auxiliary air tank being substantially at the potential of the protected device and being insulated from ground, a main compressed air tank remote from the gap device and substantially at ground potential, and insulating conduit means connecting the main air tank to the auxiliary air tank.

8. A high-voltage protective gap device adapted to be connected across an electrical device for overvoltage protection, said gap device comprising spaced electrodes supported in a housing, a vertical column of insulators, an auxiliary compressed air tank mounted adjacent the top of said column of insulators, a main compressed air tank disposed below, and remote from, the auxiliary air tank, insulating conduit means extending through the column of insulators connecting the main air tank to the auxiliary air tank, said gap housing being mounted closely adjacent the auxiliary air tank, and means for directing a blast of air from the auxiliary air tank into the space between the electrodes of the gap.

9. A high-voltage protective gap device adapted to be connected across an electrical device for overvoltage protection, said gap device comprising spaced electrodes supported in a housing, a column of insulators, a main compressed air tank at the bottom of said column of insulators, an auxiliary compressed air tank mounted on top of the column of insulators, insulating conduit means connecting said main and auxiliary compressed air tanks, the gap housing being mounted adjacent the auxiliary air tank, and valve means for directing a blast of air from the auxiliary air tank into the space between the electrodes of the gap.

10. A high-voltage protective gap device adapted to be connected across an electrical device for overvoltage protection, said gap device comprising a first electrode having a hollow therein, a second generally rod-like electrode extending into the hollow of the first electrode and having a central opening therethrough, said electrodes being spaced apart to form a gap and being enclosed in a housing, vent means connected to the opening in the second electrode at the end thereof remote from the gap, a vertical column of insulators, an auxiliary compressed air tank mounted adjacent the top of said column of insulators, a main compressed air tank disposed below, and remote from, the auxiliary air tank, insulating conduit means extending through the column of insulators connecting the main air tank to the auxiliary air tank, said gap housing being mounted closely adjacent the auxiliary air tank, and means for directing a blast of air from the auxiliary air tank into the space between the electrodes of the gap.

11. A high-voltage protective gap device adapted to be connected across an electrical device for overvoltage protection, said gap device comprising a first electrode having a hollow therein, a second generally rod-like electrode extending into the hollow of the first electrode and having a central opening therethrough, said electrodes being spaced apart to form a gap and being enclosed in a housing, vent means connected to the opening in the second electrode at the end thereof remote from the gap, a column of insulators, a main compressed air tank at the bottom of said column of insulators, an auxiliary compressed air tank mounted on top of the column of insulators, insulating conduit means connecting said main and auxiliary compressed air tanks, the gap housing being mounted on the auxiliary air tank, and valve means for directing a blast of air from the auxiliary air tank into the space between the electrodes of the gap.

12. A high-voltage protective gap device adapted to be connected across an electrical device for overvoltage protection, said gap device comprising spaced electrodes supported in a housing, a column of insulators, a main compressed air tank at the bottom of said column of insulators, an auxiliary compressed air tank mounted on top of the column of insulators, insulating conduit means connecting said main and auxiliary compressed air tanks, the gap housing being mounted on the auxiliary air tank, valve means for directing a blast of air from the auxiliary air tank into the space between the electrodes of the gap, and current-responsive means for effecting opening of the valve means to initiate the air blast immediately after a discharge has started in the gap and for effecting closing of the valve means to interrupt the air blast when current ceases to flow through the gap.

13. A high-voltage protective gap device adapted to be connected across an electrical device for overvoltage protection, said gap device comprising spaced electrodes supported in a housing, a column of insulators, a main compressed air tank at the bottom of said column of insulators, an auxiliary compressed air tank mounted on top of the column of insulators, insulating conduit means connecting said main and auxiliary compressed air tanks, the gap housing being mounted on the auxiliary air tank, valve means for directing a blast of air from the auxiliary air tank into the space between the electrodes of the gap, current-responsive means for effecting opening of the valve means to interrupt the air blast when current ceases to flow through the gap, and means responsive to the pressure in the auxiliary air tank for effecting completion of a bypass circuit around the protected device when said pressure falls below a predetermined value.

14. In a high-voltage protective gap device, a column of hollow insulators, an insulating conduit means disposed within each of said insulators, means for connecting the conduit means of adjacent insulators, a main air tank connected to the conduit means of the lowermost insulator, an auxiliary air tank connected to the conduit means of the uppermost insulator, a gap device, and means for directing a blast of air from the auxiliary air tank into the gap device.

15. In a protective system for an electrical device connected in a high-voltage line, said protective system including a pneumatic system having elements at line potential and elements at ground potential, a vertical column of hollow insulators, and insulating conduit means extending through said hollow insulators for connecting said elements at line potential to the elements at ground potential.

16. In a protective system for an electrical device connected in a high-voltage line, said protective system including a pneumatic system having elements at line potential and elements at ground potential, a vertical column of hollow insulators, insulating conduit means disposed within each of said insulators, means for connecting together the conduit means of adjacent insulators, and means for connecting the conduit means to said elements at line potential and to said elements at ground potential.

RALPH E. MARBURY.

REFERENCES CITED

The following references are of record in the file of this patent:

UNITED STATES PATENTS

| Number | Name | Date |
| --- | --- | --- |
| 2,041,683 | Marx | May 19, 1936 |